United States Patent [19]

Pepe et al.

[11] 4,273,694
[45] Jun. 16, 1981

[54] CERTAIN ACID SALTS OF POLYESTER AMINOORGANOSILANES

[75] Inventors: Enrico J. Pepe; James G. Marsden, both of Amawalk, N.Y.

[73] Assignee: Union Carbide Corporation, New York, N.Y.

[21] Appl. No.: 136,362

[22] Filed: Apr. 1, 1980

[51] Int. Cl.³ .................... C08J 3/00; C08G 77/26
[52] U.S. Cl. .................... 260/29.2 E; 260/29.1 SB; 260/29.2 R; 260/29.2 M; 525/443; 525/446; 528/38; 528/288

[58] Field of Search .................... 528/38, 288; 260/29.1 SB, 29.2 R, 29.2 M, 29.2 E; 525/443, 446

[56] References Cited

U.S. PATENT DOCUMENTS

| | | | |
|---|---|---|---|
| 2,763,629 | 9/1956 | Gottfurcht | 260/29.2 M |
| 2,965,515 | 12/1960 | Jellinek | 260/29.2 M |
| 4,122,074 | 10/1978 | Pepe et al. | 526/26 |
| 4,163,073 | 7/1979 | Pepe et al. | 427/221 |

Primary Examiner—Lucille M. Phynes
Attorney, Agent, or Firm—Richard J. Gallagher

[57] ABSTRACT

This invention relates to time-stable strong mineral acid salts of polyester aminoorganosilanes.

6 Claims, No Drawings

CERTAIN ACID SALTS OF POLYESTER AMINOORGANOSILANES

BACKGROUND OF THE INVENTION

1. Field of the Invention

This invention relates to certain mineral acid salts of polyester aminoorganosilanes.

2. Description of the Prior Art

U.S. Pat. No. 4,122,074 (see also its divisional: U.S. Pat. No. 4,163,073) describes certain polyester aminoorganosilanes which have utility as adhesion promoters between inorganic siliceous materials and organic resins. The patent teaches that organic acids such as acetic acid may be utilized to produce cationically charged aminoalkylalkoxysilane groups along the polyester silane chain. It has been found that the silanes produced according to the patent have time-stabilities which can be improved upon.

SUMMARY OF THE INVENTION

It has now been found that relatively time-stable polyester aminoorganosilane salts can be prepared from polyester aminoorganosilanes such as those described in U.S. Pat. No. 4,122,074 and strong mineral acids having a pKa of less than about $-3$.

DESCRIPTION OF THE PREFERRED EMBODIMENTS

The time-stable polyester aminoorganosilane salts according to the present invention are polymers having molecular weights of greater than 1000 comprising units of the formulae

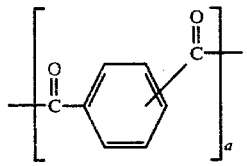

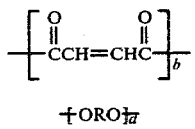

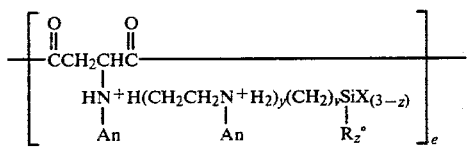

wherein R is a divalent hydrocarbon radical, and is preferably an alkylene radical having from 2 to 6 carbon atoms such as 1,2-propylene, $R^o$ is a monovalent alkyl, aryl, or aralkyl group, X is a monovalent alkoxy, hydroxy, or oxy-group, and is preferably an alkoxy group having up to 8 carbon atoms such as methoxy and ethoxy, y is 0 or 1, v is an integer of from 1 to 6, z is 2, 1, or preferably 0, a is 0 or is preferably a mole fraction of from 0.004 to 0.6, b and e are mole fractions ranging from about 0.004 to about 0.6 and d is a mole fraction ranging from about 0.4 to about 0.6, with the proviso that d is greater than, equal to, or slightly less than the sum of a,b, and e, and An is the anion of a monovalent mineral acid which has a pKa of less than about $-3$. X can be a hydroxy and/or oxy-group as indicated above due to random hydrolysis which results in Si—OH moieties and/or to random condensation, which results in Si—O—Si bonding. Such polymers are polyesters wherein each of the available carbonyl radical valences is satisfied by a valence of an —ORO— radical or by a hydroxyl group.

Polyester aminoorganosilanes according to the present invention can be prepared by way of Michael addition of an appropriate aminoorganosilane to an appropriate unsaturated conjugated polyester.

Appropriate unsaturated conjugated polyesters comprise units of the formulae

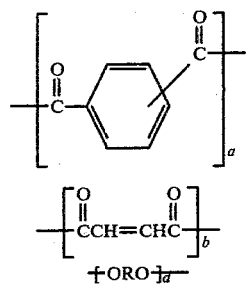

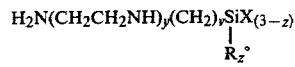

wherein R, a,b, and d are as defined above. Such polyesters are readily available and can be obtained as described in U.S. Pat. No. 4,122,074. For the purpose of preparing high molecular weight polyesters, i.e. those wherein the molecular weight is above 5000, such readily available polyesters can be chain-extended with organic diisocyanates in a manner fully disclosed in U.S. Pat. No. 4,122,074.

Appropriate aminoorganosilanes are those of the formula $$H_2N(CH_2CH_2NH)_y(CH_2)_vSiX_{(3-z)}$$
$$R_z^o$$

wherein X, $R^o$, y, v and z are as defined above. The most preferred aminoorganosilane is gamma-aminopropyltriethoxysilane.

The Michael addition reaction according to the present invention is carried out as follows: an appropriate unsaturated polyester resin as described above is dissolved in the monomethyl ether of ethylene glycol to give at 65 weight percent solution of the resin. The water content of the solution is adjusted to 0.35 percent. The solution is heated to and maintained at 75° C. and an appropriate aminoorganosilane as described above is then added to the solution dropwise. The solution is agitated throughout the dropwise addition of the aminoorganosiloxane. After all of the aminoorganosiloxane has been added, the solution is cooled to ambient temperature. At this point the strong acid, which is anhydrous and is dissolved in the monomethyl ether of ethylene glycol, is added to the solution. The amount of acid utilized is that which is necessary to react completely with all of the amino groups which have been added to the polyester resin by its reaction with the aminoorganosilane.

The acids which provide time-stable salts according to the present invention are strong mineral acids which have a pKa of less than about $-3$. The exponent pKa, which equals $-\log_{10}Ka$, is convenient measure of acid strength. A stronger acid has more tendency to dissociate or be H+ — reactive than does a weaker acid. Therefore, the stronger the acid, the higher its dissociation constant or acidity constant, and the lower its pKa. Hydrochloric acid, for instance, has pKa of −6.1, while acetic acid has a pKa of 4.76.

In addition to providing polyester aminoorganosilane acids salts having very satisfactory useful lives, as illustrated below, the utilization of strong mineral acids according to the present invention permits the preparation of useful polyester aminoorganosilane acid salts with a lower silylation level than is necessary when using e.g. acetic acid.

The polyester aminoorganosilane acid salts of the present invention can be utilized as reinforcing size binders and protective coatings for fiberglass, mineral, and metallic substrates, in the manner described in U.S. Pat. No. 4,122,074.

COMPARATIVE EXAMPLE

The Example compares the time-stability of an acetic acid salt according to U.S. Pat. No. 4,122,074 with that of a hydrochloric acid salt according to the present invention.

In a procedure analogous to "Procedure B" (columns 7–8 of the patent), 4933 grams of the polyester resin referred to in the patent as "Polyester B" was dissolved in 2654 grams of ethylene glycol monomethyl ether, heated to 75° C., silylated with 2654 grams of 3-$NH_2C_3H_6$-Si($OC_2H_5$)$_3$, cooled and diluted with 1151 grams of glacial acetic acid. A 1 weight percent active solids solution of this product in distilled water produced a slightly hazy dispersion that remained unchanged for 36 hours. After about six weeks storage at room temperature, this product no longer produced slightly hazy dispersions but instead produced very milky dispersions that rapidly formed a resinous precipitate thus indicating degradation of the Michael addition reaction product.

Results of a slightly accelerated aging test with a fresh preparation of this product reproduced this degeneration in dispersibility and appears to correlate with a drop in amino titer and regeneration of fumarate unsaturation, see the Table. The observation increased in fumarate unsaturation after 96 hours at 50° C. and an accompanying decrease in titratable amine strongly points to near complete reversal of the Michael Addition silylation process.

TABLE

ACETIC ACID SALT AGING STABILITY

| Heat History | (20 Wt. % Solids) Aqueous Dispersibility | Functional Group Analysis (Moles/Kg) Amine | Unsaturated | NMR Analysis (Mole Ratio) Fumarate/Phthalate |
|---|---|---|---|---|
| Calculated (Neat Basis) | — | 0.8 | 2.6 | 2.7 |
| Initially Made | Excellent | 0.77 | 2.95 | 2.8 |
| After 2 Hrs. at 75° C. | Marginal | 0.72 | 3.12 | 3.1 |
| After 96 Hrs. at 50° C. | Unacceptable | 0.13 | 3.6 | 3.3 |
| Calculated (Total Reversion) | — | 0 | 3.4 | 3.5 |

In a preparation generally similar to "Procedure B" of U.S. Pat. No. 4,122,074, 823 grams of the polyester resin referred to in the patent as "Polyester B" was dissolved in 443 grams of ethylene glycol monomethyl ether, heated to 75° C., silylated with 177 grams of 3-$NH_2C_3H_6$-Si($OC_2H_5$)$_3$, cooled to room temperature and diluted with 29.2 grams of dry hydrochloric acid gas which has been added to ethylene glycol monomethyl ether. After a week at 50° C., this product of the present invention still produced a near clear 20% aqueous dispersion, indicating little if any reversal of the Michael addition silylation process.

In a preparation generally similar to "Procedure B" of U.S. Pat. No. 4,122,074, 334.75 grams of the polyester resin referred to in the patent as "Polyester B" was dissolved in 180.25 grams of ethylene glycol monomethyl ether, heated to 75° C., silylated with 41.8 grams of 3-$NH_2C_3H_6$-Si($OC_2H_5$)$_3$, cooled to room temperature, and diluted with 6.89 grams of dry hydrochloric acid gas which had been added to ethylene glycol monomethyl ether. After accelerated aging for seven hours at 120° C., the NMR analysis of Fumarate: Phthalate mole ratio showed 3.05 (calculated: 3.02), thus confirming the excellent storage stability of a product according to the present invention.

LARGE SCALE PREPARATIVE EXAMPLE

The reaction was carried out in a 22 liter 3-necked flask equipped with a mechanical stirrer, a heating mantle, a dropping funnel, a thermometer attached to an automatic heat control switch, and a water condensor protected at the exit-port by a dry-nitrogen by-pass. The flask was charged with 14,584.6 grams of a 65 weight-percent solution of a polyester resin product of the formula HOCH($CH_3$)$_2$$CH_2$O[C(O)CH=CH-C(O)OCH$_2$CH($CH_3$)O]$_{21}$H in the monomethyl ether of ethylene glycol. Based on initially analyzed water, 45 grams of water was added to achieve the target level of 0.35 weight-percent water. The solution was heated to 75° C. Then 1,252.5 grams of gamma-aminopropyltriethoxysilane was added to the solution dropwise over a period of 4.75 hours with maximum agitation throughout. After a further 0.5 hour hold period at 75° C., the reaction mixture was cooled to about 25° C. over a period of 2.5 hours. Then, 206.6 grams of anhydrous hydrogen chloride dissolved in 1,549 grams of monomethyl ether of ethylene glycol was rapidly added with moderate stirring over a period of a few minutes. The result is 18,537.7 grams of an amber to red solution containing polyester-aminopropylsilane hydrochloride of the present invention.

What is claimed is:

1. A polyester polymer product having a molecular weight of greater than 1000 and comprising units of the formulae

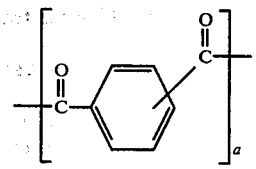

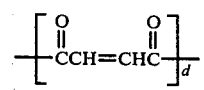

-continued

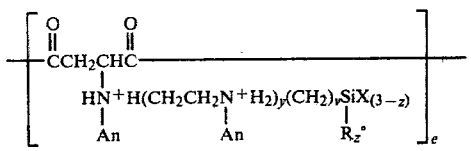

wherein R is a divalent hydrocarbon radical, R⁰ is a monovalent alkyl, aryl, or aralkyl group, X is a monovalent alkoxy, hydroxy, or oxy- group, y is 0 or 1, v is an integer of from 1 to 6, z is 2, 1, or 0, a is 0 or a mole fraction of from 0.004 to 0.6, b and e are mole fractions ranging from about 0.004 to about 0.6, and d is a mole fraction ranging from about 0.4 to about 0.6, with the proviso that d is greater than, equal to, or slightly less than the sum of a, b, and e, and An is the anion of a strong monovalent mineral acid which has a pKa of less than −3.

2. A polyester polymer product according to claim 1 comprising units of the formulae

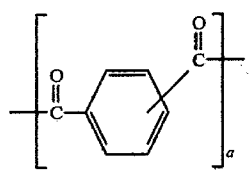

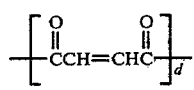

−(ORO)ₐ

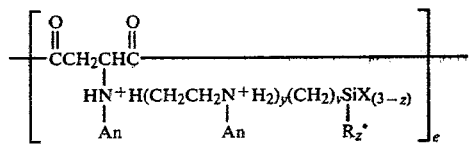

wherein R is an alkylene radical having from 2 to 6 carbon atoms, X is an alkoxy group having up to 8 carbon atoms, and a is a mole fraction of from 0.004 to 0.6.

3. A polyester polymer product according to claim 2 comprising units of the formulae

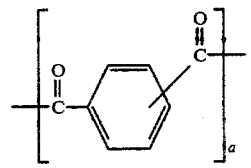

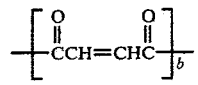

−(ORO)ₐ

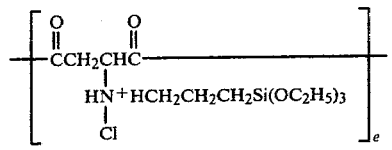

4. A polyester polymer product prepared by a process which comprises reacting an unsaturated conjugated polyester having a molecular weight of at least 1000 comprising units of the formulae

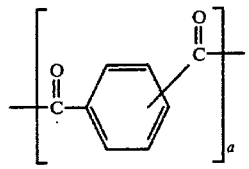

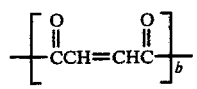

−(ORO)ₐ wherein R is a divalent hydrocarbon radical, a is 0 or a mole fraction of from 0.004 to 0.6, b is a mole fraction ranging from 0.004 to 0.6, and d is a mole fraction ranging from 0.4 to 0.6, with an aminoorganosilane of the formula

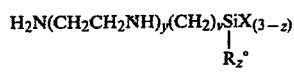

wherein R⁰ is a monovalent alkyl, aryl, or aralkyl group, X is a monovalent alkoxy group, y is 0 or 1, v is an integer of from 1 to 6, and z is 2, 1, or 0 at a temperature of from about 0° C. to about 235° C., to produce the polyester aminoalkylalkoxysilane, followed by reacting said polyester aminoalkylalkoxysilane with a monovalent mineral acid having a pKa of less than −3.

5. A polyester polymer product according to claim 4 wherein the unsaturated conjugated polyester comprises units of the formulae

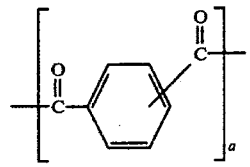

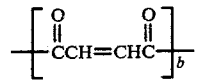

−(ORO)ₐ.

wherein a is a mole fraction of from 0.004 to 0.6, wherein the aminoorganosilane has the formula

and wherein the mineral acid is hydrochloric acid.

6. A polyester polymer product according to any one of the claims 1, 2, 3, 4 or 5 which is dispersed in a major amount of water.

* * * * *

UNITED STATES PATENT AND TRADEMARK OFFICE
CERTIFICATE OF CORRECTION

PATENT NO. : 4,273,694

DATED : June 16, 1981

INVENTOR(S) : E. J. Pepe et al

It is certified that error appears in the above—identified patent and that said Letters Patent is hereby corrected as shown below:

In the Claims:

Claims 1 and 2, in the second formula depicted, please delete the subscript "d" and insert therefore --b--.

Signed and Sealed this

Twenty-ninth Day of December 1981

[SEAL]

Attest:

GERALD J. MOSSINGHOFF

Attesting Officer

Commissioner of Patents and Trademarks